United States Patent [19]

McEntire et al.

[11] 4,310,634
[45] Jan. 12, 1982

[54] NOVEL POLYISOCYANURATE CATALYST

[75] Inventors: Edward E. McEntire; Robert L. Zimmerman, both of Austin, Tex.

[73] Assignee: Texaco Development Corp., White Plains, N.Y.

[21] Appl. No.: 216,403

[22] Filed: Dec. 15, 1980

Related U.S. Application Data

[62] Division of Ser. No. 85,184, Oct. 15, 1979, abandoned.

[51] Int. Cl.$^3$ ............................................. C08G 18/16
[52] U.S. Cl. ................................... 521/115; 521/128; 528/49; 528/52
[58] Field of Search .................. 521/128, 115; 528/49, 528/52

[56] References Cited

U.S. PATENT DOCUMENTS

| | | | |
|---|---|---|---|
| 3,050,475 | 8/1962 | Müller et al. | 528/49 |
| 3,516,950 | 6/1970 | Haggis | 528/53 |
| 3,580,868 | 5/1971 | Diehr et al. | 521/128 |
| 3,620,986 | 11/1971 | Diehr et al. | 528/53 |
| 3,625,872 | 12/1971 | Ashida | 521/128 |
| 3,635,848 | 1/1972 | Rambosek | 252/182 |
| 3,725,319 | 4/1973 | Frisch | 521/128 |
| 3,745,133 | 7/1973 | Comunale et al. | 521/128 |
| 4,009,307 | 2/1977 | Erikson et al. | 528/49 |

OTHER PUBLICATIONS

Condon et al., *J. Am. Chem. Soc.*, 92, 1970, pp. 6625–6630.

*Primary Examiner*—Maurice J. Welsh
*Attorney, Agent, or Firm*—Carl G. Ries; Robert A. Kulason; Kenneth R. Priem

[57] ABSTRACT

Polyisocyanurate catalysts are disclosed which have the formula:

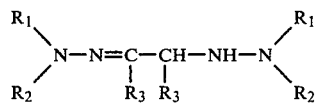

where $R_1$ and $R_2$ are independently selected from alkyl groups of less than about 3 carbon atoms or where $R_1$ and $R_2$ together comprise cycloalkyl or morpholino groups and where $R_3$ is hydrogen or alkyl groups containing less than about 3 carbon atoms. Said catalysts are useful in promoting the reaction between a polyol and an aromatic polyisocyanate to prepare a polymer containing recurring isocyanurate and urethane linkages.

8 Claims, No Drawings

NOVEL POLYISOCYANURATE CATALYST

This is a division of application Ser. No. 085,184, filed Oct. 15, 1979, and now abandoned.

BACKGROUND OF THE INVENTION

1. Field of the Invention

This invention relates to the preparation of polyisocyanurate polymers such as polymer foams, and is more particularly concerned with use of a class of catalyst which promote the trimerization of polyisocyanates to polyisocyanurate polymers.

2. Description of the Prior Art

Polyisocyanurate polymers such as rigid polyisocyanurate foams are known in the art. The prior art discloses methods for preparing such polymers by reacting an organic polyisocyanate with a polyether or polyester polyol utilizing a polyisocyanurate group formation catalyst. Foams are prepared by effecting such reaction in the presence of a blowing agent. In the optimum situation the isocyanurate catalyst utilized promotes formation of both isocyanurate linkages and urethane linkages to produce urethane-modified polyisocyanurate polymers. See, for example, U.S. Pat. Nos. 3,516,950; 3,580,868; 3,620,986; 3,625,872; 3,635,848; 3,725,319; and 3,745,133.

Compounds which are known as catalysts for polyisocyanurates are the N-alkali metal and N-alkaline earth metal compounds of primary and secondary aliphatic, araliphatic, aromatic amines and heterocyclic amines. Amines which may be employed are, for example, methylamine, N-butylamine, tert.-butylamine, methoxy-n-propylamine, oleylamine, diethylamine, di-n-butylamine, diisobutylamine, dicyclohexylamine, N-methylstearylamine, benzylamine, ethylbenzylamine, dibenzylamine, phenylbenzylamine, aniline, naphthylamine, 3-N-ethylaminotoluene, toluidine, methylaniline, N-isobutylaniline, diphenylamine, N-methylanisidine, and also pyrrolidine, piperidine, 1,2,3,4-tetrahydroquinoline, pyrrole, indole, 2-methylindole, 2,3-dimethylindole, 5-methoxy-2,3-dimethylindole, carbazole, 3,6-dinitrocarbazole, N,N'-dimethylethylenediamine and N,N'-dimethyl-p-phenylenediamine.

N-alkali metal and N-alkaline earth metal compounds of carboxylic acid amides are also known catalysts. These include aliphatic and aromatic carboxylic acid amides and also such cyclic acid amides as imides and lactams. The following compounds are examples of compounds suitable for the production of such N-metal compounds: acetamide, trimethylacetamide, myristinic acid amide, stearoyl amide, N-methylacetamide, phenylacetamide, benzamide, N-alkyl benzamides, succinimide, tetrapropenyl succinimide, phthalimide, pyrrolidone, butyrolactam, caprolactam, phthalimidine and saccharine.

Also, as catalysts alkali or alkaline earth metal may be combined with the amines or carboxylic acid amides such as, for example, lithium, sodium, potassium, magnesium, barium, and calcium, with the preferred metals being lithium, sodium, potassium and calcium.

Also, alkali or alkaline earth metal salts of carboxylic acids are useful as catalysts for isocyanurate polymers.

The catalyst of this invention do not contain alkali or metals and provide an unexpected beneficial delay in the isocyanurate reaction which aids in processing. This delay is especially helpful where molding is undertaken. The catalyst herein also gives a complete product cure.

SUMMARY OF THE INVENTION

This invention comprises a novel process for preparing a polymer containing recurring isocyanurate and urethane linkages, which polymer comprises a reaction product of a polyol and an aromatic polyisocyanate utilizing as an isocyanurate formation catalyst a particularly useful and novel specific class of compounds known as falling within the formula:

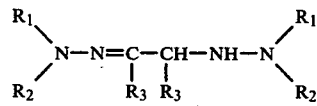

where $R_1$ and $R_2$ are independently selected from alkyl groups of less than about 3 carbon atoms or where $R_1$ and $R_2$ together comprise cycloalkyl or morpholino groups and where $R_3$ is hydrogen or alkyl groups containing less than about 3 carbon atoms. The invention is also the novel compositions described above.

DESCRIPTION OF THE PREFERRED EMBODIMENTS

The catalysts of this invention are useful for the production of isocyanurate either used alone or in combination with other known catalysts. Compounds having the general formula depicted in the summary of the invention are included within the scope of our invention.

In a preferred embodiment $R_1$ and $R_2$ are alkyl groups having less than about 3 carbon atoms and $R_3$ is hydrogen.

In a particularly preferred embodiment $R_1$ and $R_2$ are methyl and $R_3$ is hydrogen and the catalyst has the formula:

$$(CH_3)_2N-NH-CH_2-CH=N-N(CH_3)_2 \qquad (I)$$

Preparation of these materials can proceed as follows for example:

If formaldehyde is added to unsymmetrical dimethylhydrazine 1-(2,2-dimethylhydrazino)-2-(2,2-dimethylhydrazono)ethane, $(CH_3)_2N-NH-CH_2-CH=N-N(CH_3)_2$ (I) is produced along with the 1-(2,2-dimethylhydrazono)-2-hydroxyethane:

$$(CH_3)_2N-N=CH-CH_2OH \qquad (II)$$

In order to obtain compound II alone, unsymmetrical methylhydrazine, $(CH_3)_2N-NH_2$, is added to formaldehyde at a temperature from about $-50°$ C. to $150°$ C. but preferably from about $0°$ C. and $80°$ C. at pressures ranging from about 0.01 atm to 200 atm but preferably at about one (1) atm. A solvent may be used but is not necessary. Suitable solvents water, alcohols and others.

The catalysts of this invention are surprisingly effective in catalyzing the isocyanurate reaction and provide a delayed reaction which is valuable for processing the foams. Furthermore, the catalysts of this invention are particularly advantageous in that they give a complete cure to the foam without other catalysts being present.

The Examples which follow depict the preparation of compounds I and II and the use of these materials as isocyanurate catalysts.

EXAMPLE I

To a 500 ml reactor equipped with a stirrer, thermometer, addition funnel and nitrogen atmosphere was charged 150 g unsym-dimethylhydrazine. With cooling to 5° C., 212 g formalin (37% formaldehyde) was added dropwise over 2 hours. After the addition, the reaction mixture was warmed to room temperature over 1.5 hours and water distilled under aspirator vacuum at 35 mm Hg to 50° C. When about 150 ml remained a 12 inch distillation column was added and the distillation was continued. When ca. 30 ml remained, the column was removed and the remainder flash distilled; 21.6 g was collected bp$_{5.6}$ 65°–67° C. This final distillate was used as a catalyst to prepare an isocyanurate foam in Example II below.

EXAMPLE II

A foam was prepared by premixing the B-component ingredients listed below, and mixing the B-component on a high speed stirrer with 57.6 parts THANATE ®P-270 polyisocyanate, and pouring the blend into a standard box mold and allowing the formulation to rise.

B-component ingredients:
25.9 parts Novolak polyol (OH No.=187, F=2.5)
0.5 parts DC-193 silicone surfactant
12 parts R-11B FREON ® fluorocarbon
4 parts catalyst from Example 1

The foam rise characteristics are recorded below:

| | |
|---|---|
| Cream time | 22 seconds |
| Tack free time | 60 seconds |
| Rise time | 53 seconds |

This formulation exhibits desirable rise characteristics for many isocyanurate from applications in that it has a relatively long cream time and yet still has a reasonably short tack free and rise time. This permits mold filling of the fluid blend and yet provides rapid cycle times for repetitive molding operations.

EXAMPLE III

This example is similar to Example I but the products are identified.

To a 1-1 flask equipped with an additional funnel and stirrer and nitrogen atmosphere was charged 300 grams unsym.-dimethylhydrazine. After cooling to 7° C., 424 grams formalin was added dropwise over 2 hours with cooling and stirring. After standing at ambient temperature for 64 hours following addition, vacuum distillation was conducted and fraction A boiling at 74° C. (4–6 mm) and fraction B boiling at 73° C. (3 mm) were collected. Analysis of these fractions showed them to contain the following compounds:

Fraction A—contained a 1:1 molar ratio of compounds I and II.
Fraction B contained compound II.
Combined isolated yields of I and II were 1.72% and 4.7% respectively.

EXAMPLES IV AND V

Rigid urethane/isocyanurate foams were prepared from the compounds of Example III by a technique similar to that described in Example II.

| | #4 | #5 |
|---|---|---|
| A Component | | |
| THANATE ®P-270 isocyanate | 58.3 parts | 58.3 parts |
| B Component | | |
| Novolak polyol (OH No. 194, F 2.4) | 25.2 parts | 25.2 parts |
| DC-193 silicone surfactant | 0.5 parts | 0.5 parts |
| FREON ®R-11B fluorocarbon | 12 parts | 12 parts |
| Catalyst - Example III, Fraction A | 4 parts | 0 parts |
| Catalyst - Example III, Fraction B | 0 parts | 4 parts |
| Foam Cure Data | | |
| Cream time, sec. | 4–5 | 18–20 |
| Tack free time, sec. | 28–30 | 60 |
| Rise time, Sec. | 45 | 105 |

Thus, compound I seems to be more active a catalyst providing a more rapid cure whereas compound II provides more of a delay.

We claim:

1. In a process for preparing a polymer containing recurring isocyanurate and urethane linkages, which polymer comprises the reaction product of a polyol and an aromatic polyisocyanate, while utilizing an isocyanurate group formation catalyst; the improvement which comprises
employing as said isocyanurate catalyst a compound falling within the following structural formula:

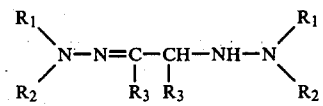

where $R_1$ and $R_2$ are independently selected from alkyl groups of less than about 3 carbon atoms or where $R_1$ and $R_2$ together comprise cycloalkyl or morpholino groups and where $R_3$ is hydrogen or alkyl groups containing less than about 3 carbon atoms.

2. The process of claim 1 where said polyol is a polyether or polyester polyol.

3. The process of claim 1 wherein said polymer is a cellular polymer obtained by reacting said polyols in said polyisocyanate in the presence of a blowing agent.

4. The process of claim 3 wherein a rigid polyisocyanurate is produced.

5. In a process for preparing a polymer containing recurring isocyanurate and urethane linkages, which polymer comprises the reaction product of a polyol and an aromatic polyisocyanate, while utilizing an isocyanurate group formation catalyst; the improvement which comprises
employing as said isocyanurate catalyst 1-(2,2-dimethylhydrazino)-2-(2,2-dimethylhydrazono)ethane.

6. The process of claim 5 where said polyol is a polyether or polyester polyol.

7. The process of claim 5 wherein said polymer is a cellular polymer obtained by reacting said polyols in said polyisocyanate in the presence of a blowing agent.

8. The process of claim 5 wherein a rigid polyisocyanurate foam is produced.

* * * * *